United States Patent
Saha et al.

(10) Patent No.: US 7,660,236 B2
(45) Date of Patent: Feb. 9, 2010

(54) SYSTEM AND METHOD OF MULTI-NODAL APS CONTROL PROTOCOL SIGNALING

(75) Inventors: Kajal Saha, Ottawa (CA); Neil Darren Hart, Chelsea (CA); Tiberiu Grigoriu, Ottawa (CA)

(73) Assignee: Alcatel Lucent, Paris (FR)

( * ) Notice: Subject to any disclaimer, the term of this patent is extended or adjusted under 35 U.S.C. 154(b) by 485 days.

(21) Appl. No.: 11/411,969

(22) Filed: Apr. 27, 2006

(65) Prior Publication Data
US 2007/0253327 A1    Nov. 1, 2007

(51) Int. Cl.
*H04J 1/16*    (2006.01)
(52) U.S. Cl. .................................... 370/219
(58) Field of Classification Search ......... 370/217–222
See application file for complete search history.

(56) References Cited

U.S. PATENT DOCUMENTS

| | | | |
|---|---|---|---|
| 5,473,599 A * | 12/1995 | Li et al. ................... 370/219 |
| 5,999,983 A * | 12/1999 | Ichimi et al. ............. 709/239 |
| 6,076,114 A * | 6/2000 | Wesley ..................... 709/235 |
| 6,285,656 B1 * | 9/2001 | Chaganty et al. ......... 370/228 |
| 6,956,816 B1 * | 10/2005 | Alexander et al. ........ 370/222 |
| 2002/0009048 A1 | 1/2002 | Hosler et al. |
| 2005/0111352 A1 * | 5/2005 | Ho et al. ................... 370/219 |
| 2005/0147028 A1 * | 7/2005 | Na et al. ................... 370/217 |

FOREIGN PATENT DOCUMENTS

EP    0 570 882    5/1993

* cited by examiner

*Primary Examiner*—Derrick W Ferris
*Assistant Examiner*—Mang Yeung
(74) *Attorney, Agent, or Firm*—Kramer & Amado, PC (57) ABSTRACT

A system and method for providing APS (automatic protection switching) redundant pair control protocol signaling for multi-nodal APS (MN-APS) is provided. Periodic liveliness messages are exchanged between each node of a redundant pair. Each liveliness message contains an IHY (I heard you) message which indicates whether or not the sender of the liveliness message received within a duration of a hold time a previously transmitted liveliness message from the recipient. When more than one MN-APS group is configured between two redundant nodes, liveliness messages are bundled together to reduce processing loads.

21 Claims, 4 Drawing Sheets

| MN-APS GROUP ID | IHY | STATUS/DIRECTIVE MSG |

| | | |
|---|---|---|
| 512  MN-APS GROUP 1 | IHY1 | A-ACTIVE |
| 514  MN-APS GROUP 2 | IHY1 | A-ACTIVE |
| 516  MN-APS GROUP 3 | IHY1 | B-ACTIVE |

| | | |
|---|---|---|
| 522  MN-APS GROUP 4 | IHY0 | C-ACTIVE |
| 524  MN-APS GROUP 5 | IHY0 | B-ACTIVE |

SYSTEM AND METHOD OF MULTI-NODAL APS CONTROL PROTOCOL SIGNALING

FIELD OF THE INVENTION

The invention relates to automatic protection switching (APS) in a communications network and more particularly to a system and method of for providing APS redundant pair control protocol signaling for multi-nodal APS (MN-APS).

BACKGROUND OF THE INVENTION

In providing communications services to customers, service providers attempt to ensure that services are delivered without loss of data and with minimal interruption. A well known approach to ensuring data transfer services is automatic protection switching or APS. In SONET/SDH, APS 1+1 is typically used for single chassis protection switching.

Figure 1A:
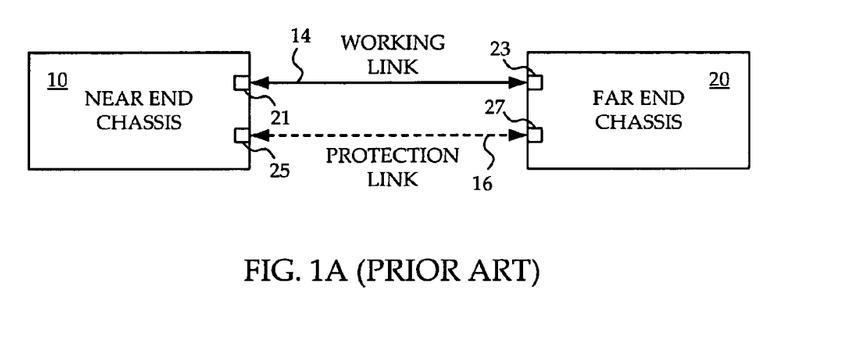
FIG. 1A is a block diagram of a known APS 1+1 single chassis configuration.

Referring now to FIG. 1A, known single chassis APS 1+1 is discussed. A near end (NE) chassis 10 having SONET line-terminating equipment (LTE) whose data traffic is to be protected, has an NE working port 21 which is coupled via a bi-directional working link 14 to a far end (FE) working port 23 of an FE chassis 20 having SONET LTE. The NE chassis 10 is also coupled from an NE protection port 25 over a bi-directional protection link 16 to an FE protection port 27 of the FE chassis 20. In this configuration, the NE chassis 10 is said to be protected by an APS group having a working circuit made up of the NE working port 21, the working link 14, and the FE working port 23, and having a protection circuit made up of the NE protection port 25, the protection link 16, and the FE protection port 27.

Typically the working circuit carries the data traffic which is to be protected. When a circuit is carrying the data traffic, it is said to be active, and when it is not carrying the traffic it is said to be inactive. For consistency the link and ports of an active circuit are referred to as being active, and the link and ports of an inactive circuit are referred to as being inactive. In automatic protection switching the working circuit is typically active when there is no failure.

In the event of a failure or degradation of the signal of the active circuit, which may be caused by failure or degradation of the active link or either active ports, APS 1+1 switches the data traffic from traversing the failed or degraded circuit to traversing the other circuit. The other circuit becomes active and the failed or degraded circuit becomes the inactive circuit. Since each single chassis has control of a working port and a protection port, it is not difficult to switch the data traffic from the working circuit to the protection circuit.

The APS 1+1 architecture also allows for the protection circuit and the working circuit to be configured to end at two different FE chassis. Such a known configuration protects against nodal or router failures in addition to link and circuit failures.

Figure 1B:
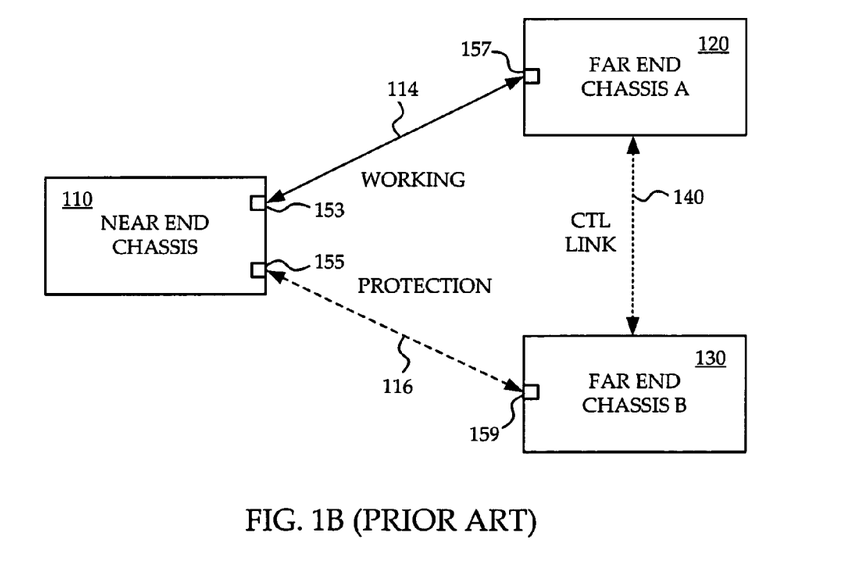
FIG. 1B is a block diagram of a known APS 1+1 dual chassis configuration.

Referring to FIG. 1B, a known dual chassis APS 1+1 configuration is discussed. A near end (NE) chassis 110 having SONET line-terminating equipment (LTE) whose data traffic is to be protected, has an NE working port 153 which is coupled via a bi-directional working link 114 to a far end (FE) working port 157 of a first FE chassis 120 (labeled "CHASSIS A" in FIG. 1B) having SONET LTE. The NE chassis 110 is also coupled from an NE protection port 155 over a bi-directional protection link 116 to an FE protection port 159 of a second FE chassis 130 (labeled "CHASSIS B" in FIG. 1B) having SONET LTE. The first and second FE chassis 120, 130 are coupled together via control link 140.

In this configuration, the NE chassis is protected by the APS group having a working circuit made up of the NE working port 153, the working link 114, and the FE working port 157, and having a protection circuit made up of the NE protection port 155, the protection link 116, and the FE protection port 159.

The second FE chassis 130 is referred to as the protection chassis or chassis in protection mode, and it is in constant communication with the first FE chassis 120 which is referred to as the working chassis or chassis in working mode.

In the event of a failure or degradation of the signal of the active circuit, which may be caused by failure or degradation of the active link, either active ports, or the working chassis, APS 1+1 switches the data traffic from traversing the failed or degraded circuit to traversing the other circuit. Since the FE chassis 120, 130 are remote from each other, FE chassis 120, 130 need to exchange switching control signals over the control link 140 to coordinate the switching from the working circuit to the protection circuit. FE chassis which exchange switching control signals over the control link 140 are said to be members of a redundant APS pair, each being an APS peer of the other within the pair. In switching the data traffic, the protection circuit becomes an active circuit and the failed or degraded working circuit becomes an inactive circuit.

Since the switching from the working circuit to the protection circuit is not local, communicating signals over the control link 140 to coordinate the switch takes time and there will be a delay before data transmission resumes on the new circuit causing an associated service interruption. The manner in which the switching from the working circuit to the protection circuit is carried out and the particulars of an APS control protocol used on the control link 140 are very important factors which determine the duration and magnitude of the service interruption.

SUMMARY OF THE INVENTION

According to one aspect the invention provides for an automatic protection switching system comprising: a local node for transmitting a first data stream to be protected; and a redundant protection pair of nodes comprising: a first remote node coupled to said local node and for receiving said first data stream from said local node; and a second remote node coupled to said local node and coupled to said first node, said second node for receiving said first data stream from said local node; wherein the first remote node is adapted to receive periodic liveliness messages from the second remote node, and to send periodic liveliness messages to said second remote node, wherein each liveliness message sent to said second remote node comprises an IHY (I Heard You) message to indicate if the first remote node received within a duration of a hold time a previously transmitted liveliness message from the second remote node, and wherein a protection switching behavior of the second remote node is dependent upon the IHY message sent to the second remote node.

In some embodiments of the invention the first remote node is adapted to operate as a protection node of an APS 1+1 group, and the second remote node is adapted to operate as a working node of said APS 1+1 group.

In some embodiments of the invention the first remote node is adapted to operate as a working node of an APS 1+1 group, and the second remote node is adapted to operate as a protection node of said APS 1+1 group.

In some embodiments of the invention the second remote node is adapted to remain inactive if the IHY message from the first remote node indicates the first remote node did not receive within the duration of the hold time a previously transmitted liveliness message from the second remote node.

In some embodiments of the invention each liveliness message sent to said first remote node comprises an IHY message to indicate if the second remote node received within a duration of a hold time a previously transmitted liveliness message from the first remote node, and wherein a protection switching behavior of the first remote node is dependent upon the IHY message sent to the first remote node.

In some embodiments of the invention each IHY message of each liveliness message is a single bit flag.

In some embodiments of the invention the first remote node is adapted to: operate in a first mode as a protection node of an APS 1+1 group; and operate in a second mode as a working node of an APS 1+1 group, and wherein the second remote node is adapted to: operate in the second mode as a working node of an APS 1+1 group when the first remote node operates in the first mode; and operate in the first mode as a protection node of an APS 1+1 group when the first remote node operates in the second mode.

According to another aspect, the invention provides for an automatic protection switching system comprising: a local node for transmitting a plurality of data streams to be protected; and a redundant protection pair of nodes comprising: a first remote node coupled to said local node and for receiving said plurality of data streams from said local node; and a second remote node coupled to said local node and coupled to said first node and for receiving said plurality of data streams from said local node; wherein the first remote node is adapted to receive from the second remote node a periodic bundle of liveliness messages comprising a liveliness message for each data stream of the plurality of data streams, and wherein the first remote node is adapted to send to the second remote node a periodic bundle of liveliness messages comprising a liveliness message for each data stream of the plurality of data streams.

In some embodiments of the invention each liveliness message comprises an IHY message indicating if a node which generated the liveliness message is receiving liveliness messages from a peer node of the redundant protection pair of nodes.

According to another aspect, the invention provides for an automatic protection switching system comprising: a local node for transmitting a plurality of data streams to be protected; and a redundant protection pair of nodes comprising: a first remote node coupled to said local node, and for receiving a first subset of data streams of said plurality of data streams from said local node; a second remote node coupled to said local node, and coupled to said first node, and for receiving said first subset of data streams of said plurality of data streams from said local node and a second subset of data streams of said plurality of data streams from said local node; and a third remote node coupled to said local node and coupled to said second node, and for receiving said second subset of data streams; wherein the second remote node is adapted to receive from the first remote node a first periodic bundle of liveliness messages comprising a liveliness message for each data stream of the first subset of data streams, and wherein the second remote node is adapted to receive from the third remote node a periodic bundle of liveliness messages comprising a liveliness message for each data stream of the second subset of data streams.

In some embodiments of the invention the first remote node is adapted to operate for each data stream of the first subset of data streams as one of: a protection node of a first respective APS 1+1 group; and a working node of a first respective APS 1+1 group; and wherein the second remote node is adapted to operate for each data stream of the first subset of data streams as one of: a protection node of the first respective APS 1+1 group if the first remote node is operating as a working node; a working node of the first respective APS 1+1 group if the first remote node is operating as a protection node; and wherein the second remote node is adapted to operate for each data stream of the second subset of data streams as one of: a protection node of a second respective APS 1+1 group; and a working node of a second respective APS 1+1 group; and wherein the third remote node is adapted to operate for each data stream of the second subset of data streams as one of: a protection node of the second respective APS 1+1 group if the second remote node is operating as a working node; a working node of the second respective APS 1+1 group if the second remote node is operating as a protection node.

In some embodiments of the invention each periodic liveliness messages comprises an IHY message to indicate if the remote node that generated the periodic liveliness message received within a duration of a hold time a previously transmitted liveliness message from the remote node receiving the periodic liveliness message, wherein a protection switching behavior of the remote node receiving the IHY message is dependent upon the IHY message sent to the remote node receiving the IHY message.

According to another aspect the invention provides for a method of automatic protection switching comprising: transmitting a first data stream to be protected from a local node to a redundant protection pair of nodes comprising a first remote node and a second remote node; transmitting periodic liveliness messages from the first remote node to the second remote node and from the second remote node to the first remote node; wherein each liveliness message sent to said second remote node comprises an IHY message to indicate if the first remote node received within a duration of a hold time a previously transmitted liveliness message from the second remote node.

Some embodiments of the invention further provide for performing protection switching at the second remote node based upon the IHY message sent to said second remote node.

In some embodiments of the invention each liveliness message sent to said first remote node comprises an IHY message to indicate if the second remote node received within a duration of a hold time a previously transmitted liveliness message from the first remote node.

Some embodiments of the invention further provide for performing protection switching at the first remote node based upon the IHY message sent to said second remote node.

In some embodiments of the invention the first remote node is adapted to operate as a protection node of an APS 1+1 group, and the second remote node is adapted to operate as a working node of said APS 1+1 group.

In some embodiments of the invention the first remote node is adapted to operate as a working node of an APS 1+1 group, and the second remote node is adapted to operate as a protection node of said APS 1+1 group.

According to another aspect the invention provides for a method of automatic protection switching comprising: transmitting a plurality of data streams to be protected from a local node to a redundant protection pair of nodes comprising a first remote node and a second remote node; transmitting a periodic bundle of liveliness messages comprising a liveliness message for each data stream of the plurality of data streams from the first remote node to the second remote node and transmitting a periodic bundle of liveliness messages comprising a liveliness message for each data stream of the plurality of data from the second remote node to the first remote node; wherein each liveliness message sent to said second remote node comprises an IHY (I Heard You) message to indicate if the first remote node received within a duration of a hold time a previously transmitted liveliness message from the second remote node.

According to another aspect the invention provides for a method of automatic protection switching comprising: transmitting a first plurality of data streams to be protected from a local node to a first redundant protection pair of nodes comprising a first remote node and a second remote node; transmitting a second plurality of data streams to be protected from a local node to a second redundant protection pair of nodes comprising the second remote node and a third remote node; transmitting a first periodic bundle of liveliness messages comprising a liveliness message for each data stream of the first plurality of data streams from the first remote node to the second remote node; and transmitting a second periodic bundle of liveliness messages comprising a liveliness message for each data stream of the second plurality of data streams from the second remote node to the third remote node; wherein each liveliness message comprises an IHY message to indicate if the remote node which sent the liveliness message received within a duration of a hold time a previously transmitted liveliness message from the remote node which received the liveliness message.

BRIEF DESCRIPTION OF THE DRAWINGS

The features and advantages of the invention will become more apparent from the following detailed description of the preferred embodiment(s) with reference to the attached figures, wherein.

It is noted that in the attached figures, like features bear similar labels.

DETAILED DESCRIPTION OF THE PREFERRED EMBODIMENTS

The preferred embodiment provides a multi-nodal (MN) APS 1+1 system architecture and control protocol. The protocol is light-weight and has low-overhead which reduces user traffic interruption due to a chassis failure, and minimizes system CPU usage. Efficiency is particularly important because the MN-APS control protocol is a high priority CPU task. Greater efficiency of this task allows for shorter intervals of communications between MN-APS peers, which decreases switchover times in response to failures, thereby reducing the duration and magnitude of traffic disruptions.

In an MN-APS 1+1 architecture, the remote working node and the remote protection node of an MN-APS group need to synchronize their MN-APS states and liveliness via a signaling protocol. Such a signaling protocol ideally is efficient and light-weight so that with little system CPU usage, an MN-APS node can switchover traffic with minimum traffic loss even with a large number of MN-APS groups.

Figure 2:
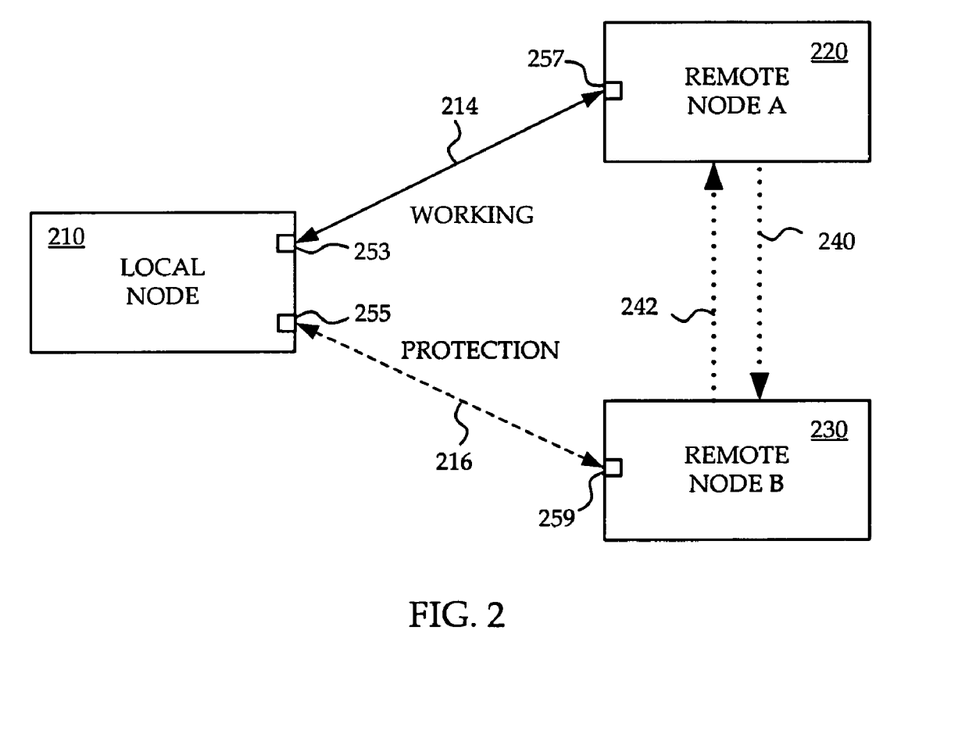
FIG. 2 is a block diagram of a multi-nodal APS 1+1 configuration having one MN-APS group according to a preferred embodiment of the invention.

Referring to FIG. 2, an example configuration of MN-APS 1+1 according to a preferred embodiment of the invention is discussed in terms of structure.

A local node 210 having SONET line-terminating equipment (LTE) whose data traffic is to be protected, has a local working port 253 which is coupled via a bidirectional working link 214 to a remote working port 257 of a first remote node 220 (labeled "NODE A" in FIG. 2) having SONET LTE. The local node 210 is also coupled from a local protection port 255 over a bi-directional protection link 216 to a remote protection port 259 of a second remote node 230 (labeled "NODE B" in FIG. 2) having SONET LTE. The first and second remote nodes 220, 230 are coupled together over a bidirectional control link comprising a forward control link 242 and a return control link 240.

In the configuration depicted in FIG. 2, the local node 210 is protected by the MN-APS group having a working circuit made up of the local working port 253, the working link 214, and the remote working port 257, and having a protection circuit made up of the local protection port 255, the protection link 216, and the remote protection port 259.

As shown in FIG. 2, an MN-APS group couples a local node 210 to two remote nodes 220, 230, in which the first remote node 220 has one of its ports assigned as a remote working port 257, while the other remote node 230 has one of its ports assigned as a remote protection port 259.

Referring to FIG. 2, the system architecture for MN-APS 1+1 is discussed in terms of function.

For the purposes of the MN-APS group depicted in FIG. 2, the second remote node 230 functions in protection mode while the first remote node 220 functions in working mode.

In the preferred embodiment, MN-APS state synchronization is maintained by way of periodic liveliness messaging between the nodes of each redundant pair of nodes referred to as peer nodes of the redundant pair or peer nodes of the MN-APS group. In the preferred embodiment periodic liveliness messages are sent using UDP/IP over forward and return control links 242 and 240 between the peer nodes 220 and 230. Each liveliness message signifies a "hello" from each redundant node to its peer. This message is checked by the node receiving the message to assess the liveliness of the transmitting node.

To synchronize the MN-APS status, status information is communicated as a part of the periodic liveliness message instead of being communicated using a separate kind of acknowledgement-based messaging protocol. Since liveliness messaging is a periodic type of messaging, the status information is ensured of continual and repeated delivery.

The status information comprises status and directive messages. The directive messages include messages such as "activate" and "deactivate", and are in the liveliness messages when they are sent from the node in protection mode 230 to its peer node in working mode 220, while the status messages include messages such as "signal failure", "signal degradation", and "signal OK", and are sent from the node in working mode 220 to its peer node in protection mode 230.

Transmission and receipt of liveliness messages according to the preferred embodiment of the invention is now discussed. In FIG. 2, the first node 220 operates in working mode, receiving directive messages from the node operating in protection mode 230. The node in protection mode 230 directs the node in working mode 220 with these directive messages to "activate" or "de-activate" the working circuit. In turn the remote node in working mode 220 returns status messages indicating the physical status of the working circuit. These status messages may include "signal failure", "signal degradation", and "signal OK." The second node 230 in protection mode receives these status messages from the node in working mode 220.

In the preferred embodiment, the remote node in protection mode 230 makes decisions regarding which state (active or inactive) each of the remote nodes (220, 230) should be in. This decision is based on information regarding the communications network's functionality.

In the APS 1+1 protocol, important information for protection switching is in the K1 and K2 bytes of the SONET/SDH (synchronous digital hierarchy) overhead. These K1/K2 bytes are also in the MN-APS 1+1 protocol and are transmitted over the protection circuit from the local node 210 to the remote node in protection mode 230. Accordingly, in MN-APS 1+1, the node in protection mode 230 makes protection switching decisions based on information received in the K1/K2 bytes from the local node 210, based on its local protection circuit status, and based on its peer node's 220 working circuit status.

Additionally, the MN-APS node in protection mode 230 checks the liveliness of its peer node in working mode 220 so that in case the peer node 220 fails, the node in protection mode 230 can initiate protection switching to take over the data traffic and hence provide nodal redundancy.

In the preferred embodiment, the liveliness messages also contain acknowledgement information to be exchanged between the pair of nodes 220, 230. Specifically an acknowledgement of receipt, or an "I Hear You" (IHY) message is included in each liveliness message sent by each node of the pair to indicate that the last liveliness message was received as expected from the other node of the pair.

If the liveliness messages did not include an acknowledgement of receipt type message, a one-way failure in the control link, for example a failure in the forward control link 242 or a failure in the return control link 240, could potentially cause an inconsistency resulting from one node considering the control link has failed and the other considering that the control link is operational. Such an inconsistency could result in data duplication.

For example, if the forward control link 242 were inoperable, and if there were a signal degradation over the working circuit, then the K1/K2 bytes from the local node 210 would indicate said signal degradation and that the node operating in protection mode 230 should switch traffic from traversing the working circuit to traversing the protection circuit. The node in protection mode 230 would then become active and begin forwarding/routing the data traffic it was receiving over the protection circuit, while sending a directive message such as "de-activate" in the liveliness messages for the purpose of causing the node in working mode 220 to cease transmission of the data traffic it was receiving over the working circuit. The node in protection mode 230 would still receive liveliness messages from the node operating in working mode 220 and hence consider the control links 242, 240 to be up, while the node in working mode 220 would not receive any messages from the node in protection mode 230 and would consider the control links 242, 240 to have failed. Since the control link and the node in working mode 220 appear to be operating normally to the node in protection mode 230, it assumes the node in working mode can receive the liveliness message indicating that it should "deactivate" forwarding of the data traffic. Assuming that the node in working mode 220 has ceased transmission of the data traffic, the node in protection mode 230 would proceed to commence transmission of the data traffic to complete the process of protection switching. In such a case for a period of time both nodes would be transmitting the same data traffic and duplication of data would result. This may last for an extended period of time typically until discovery and intervention by an administrator or operator and certainly for a period of time much longer than the duration of a send-receive liveliness message cycle.

The IHY message in the liveliness messages ensures the detection of a "one-way" communication failure of the control links 242, 240, and ensures it is detected in a few cycles of liveliness messaging. In the preferred embodiment, both the node in working mode 220 and the node in protection mode 230 would not register the failure in the control links 242, 240 until the passage of a duration of time or control link failure hold time after the last liveliness message was received. Once that hold time has passed, the redundant pair node which has not heard a liveliness message from the other node within that time, begins generating IHY messages which reflect this. This hold time can be as short as the time of a single liveliness message cycle and typically would last the duration of a few liveliness message cycles. Since the sending and receiving of the liveliness messages is periodic, the inclusion of an IHY message in the liveliness message allows each node of a pair to continually and repeatedly be apprised of the ability of the other node of the pair to receive liveliness messages.

In the case of the failure discussed above, an IHY message in the liveliness messages from the node in working mode 220 would begin to indicate, after the hold time subsequent to the failure of the forward control link 242, that the node in working mode 220 is not receiving messages from the node in protection mode 230. After receiving this indication in the liveliness messages, the node in protection mode 230 would know after the hold time (preferably in not much more time than a single liveliness messaging cycle), that the forward control link 242 is no longer operative and would become inactive allowing the remote node in working mode 220 to continue to stay active so that no duplication would result. The node in protection mode 230 could then communicate with the local node to request rerouting around the protection pair in hopes of remedying the degradation of the signal.

Another example of an inconsistency which is addressed by the preferred embodiment of the invention is if there is a misconfigured and inconsistent switching hold time for each of the peer nodes of an APS group. If for example there were a 100 second switching hold time in the working node and a 3 second switching hold time in the protection node, in the case of a failure there could be 97 seconds of inconsistent behavior, during which one node would act as if the failure had occurred while the other node would act as if the failure had not yet occurred. By using the liveliness messages, the peer nodes could after a short control link failure hold time (as discussed above preferably about one liveliness message cycle) coordinate their behavior based on exchanged status and directive messages and the IHY messages, thereby leading to consistent behavior by the peer nodes in a time frame much earlier than the 97 second example of above. This approach also avoids the need for both nodes to negotiate to have the same minimum switching delay or switching hold time.

In another example situation, an administrator or operator wishes to make the working circuit inactive to, for example, perform network maintenance on the working circuit or on the remote node in working mode.

In this case if the forward control link 242 were inoperable and the return control link 240 were operational, then the node in working mode 220 would not be able to receive periodic liveliness messages from the node in protection mode 230. The node in working mode 220 would continue to remain active and transmit/forward data traffic since the state of the node in protection mode 230 would be unknown to it.

In known implementations without an IHY flag, a protection mode would simply make the switch for the data transmissions from traversing the working circuit to traversing the protection circuit by becoming active and sending the "de-activate" message to the working node. The node in protection mode would have no way of knowing that the "de-activate" signal was not reaching its peer node, and that data duplication was resulting.

According to the preferred embodiment, the node in protection mode 230 would after the hold time (preferably about one cycle of liveliness messages), know that the node in working mode was not receiving the "de-activate" message and hence that there would be data duplication if the node in protection mode became active. In this case the node in protection mode would not become active, and the local node, administrator, or operator would be informed that the switch from the working circuit to the protection circuit could not occur.

Figure 3A:
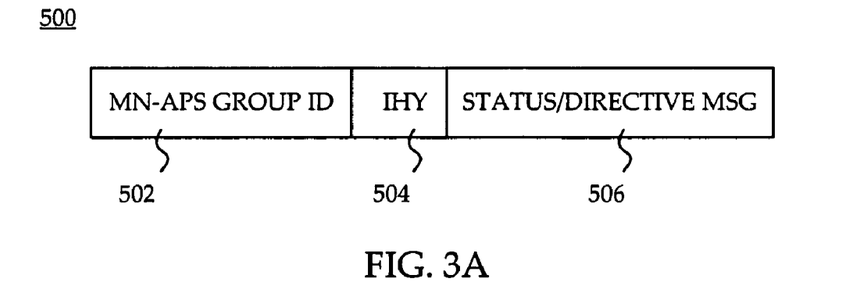
FIG. 3A is a block diagram of a liveliness message according to a preferred embodiment of the invention.

Referring to FIG. 3A an example liveliness message 500 is discussed. The liveliness message 500 includes an MN-APS group ID 502, an IHY message 504, and a status/directive message 506. In the preferred embodiment, the IHY message 504 is simply a one bit flag which indicates if the node which generated the IHY message 504 is still receiving liveliness messages from its peer node.

Assuming the forward and return control links 242, 240 are operating properly, in the event of a failure or degradation of the signal of the active circuit, which may be caused by failure or degradation of the active link, either active ports, or the node in working mode 220, MN-APS 1+1 switches the data traffic from traversing the failed or degraded working circuit to traversing the protection circuit. In association with the switch, the node in protection mode 230, sends the node in working mode liveliness messages indicating that it should "deactivate" forwarding of the data traffic. The node in working mode 220 ceases transmission of the data traffic, while the node in protection mode 230 proceeds to commence transmission of the data traffic to complete the process of protection switching.

Since each MN-APS 1+1 group has only two redundant ports at the remote nodes, in most deployed, a redundant pair of nodes would service more than one MN-APS 1+1 group. In fact each node of a redundant pair is able to act as a node in protection mode in respect of one MN-APS 1+1 group while acting as a node in working mode in respect of another MN-APS 1+1 group.

Figure 4:
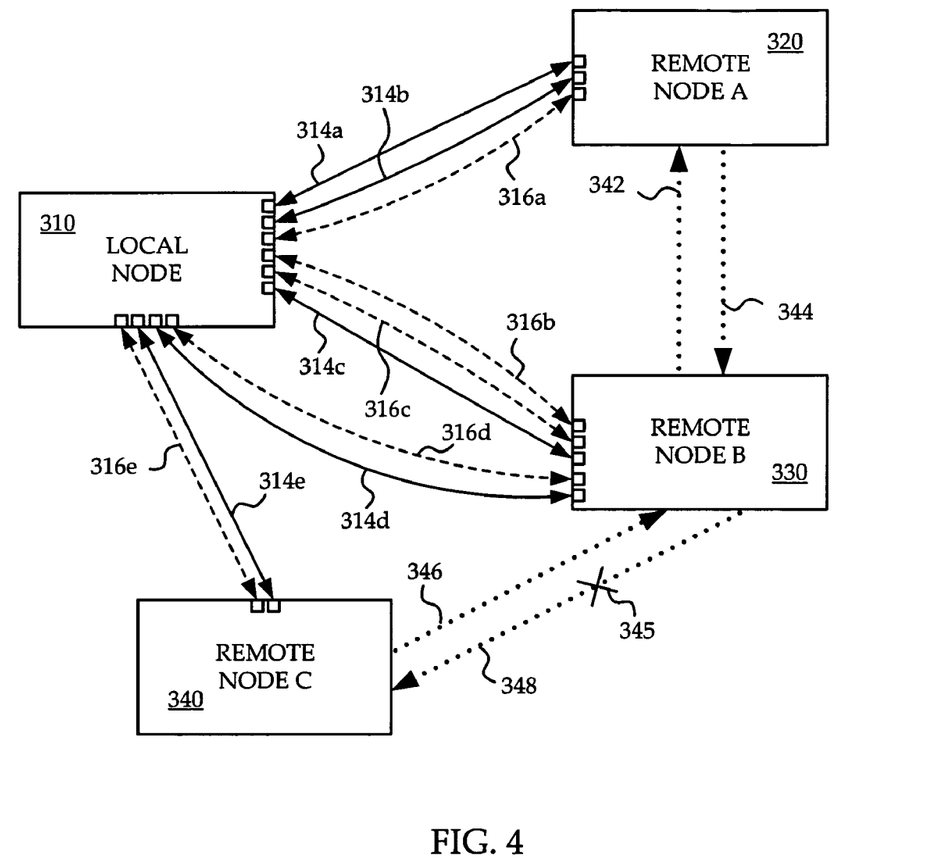
FIG. 4 is a block diagram of a multi-nodal APS configuration having five MN-APS groups according to a preferred embodiment of the invention.

Referring to FIG. 4, an implementation with multiple MN-APS 1+1 groups and multiple redundant nodes is discussed. Local node 310 has five MN-APS 1+1 groups protecting its data transmissions. Group 1 is made up of a working circuit 314a linked with a first remote node 320 (labeled "REMOTE NODE A" in FIG. 4). As discussed above each circuit is made up of a local port, a link, and a remote port. Although these are not labeled explicitly in FIG. 4 they are present and they behave in a similar manner as those discussed in association with FIG. 2. Group 1 also is made up of a protection circuit 316b linked with a second remote node 330 (labeled "REMOTE NODE B" in FIG. 4). Group 2 is made up of a working circuit 314b linked with the first remote node 320, and a protection circuit 316c linked with the second remote node 330. Group 3 is made up of a protection circuit 316a linked with the first remote node 320 and a working circuit 314c linked with the second remote node 330. Group 4 is made up of a protection circuit 316d linked with the second remote node 330, and a working circuit 314e linked with a third remote node 340 (labeled "REMOTE NODE C" in FIG. 4). Group 5 is made up of a working circuit 314d linked to the second remote node 330 and a protection circuit 316e linked to the third remote node 340.

The second remote node 330 is coupled to the first remote node 320 by a forward control link 342 and a return control link 344. The third remote node 340 is coupled to the second remote node 330 by a forward control link 346 and a return control link 348.

As can be seen in FIG. 4, the first remote node 320 acts as the node in working mode for MN-APS 1+1 groups 1 and 2, and acts as the node in protection mode for MN-APS 1+1 group 3, whereas the second remote node 330 acts as the node in protection mode for MN-APS 1+1 groups 1 and 2 and acts as the node in working mode for MN-APS 1+1 group 3. The second remote node 330 also acts as the node in protection mode for MN-APS 1+1 group 4 and acts as the node in working mode for MN-APS 1+1 group 5 while the third remote node 340 acts as the node in working mode for MN-APS 1+1 group 4 and acts as the node in protection mode for MN-APS 1+1 group 5.

In a similar manner to that discussed above, in each MN-APS 1+1 group its pair of redundant nodes sends liveliness messages to its peer. As such liveliness messages in respect of groups 1, 2, and 3 traverse across the forward and return control links 342, 344, between the first remote node 320 and the second remote node 330, and liveliness messages in respect of groups 4 and 5 traverse across the forward and return control links 346, 348 between the second remote node 330 and the third remote node 340.

Figure 3B:
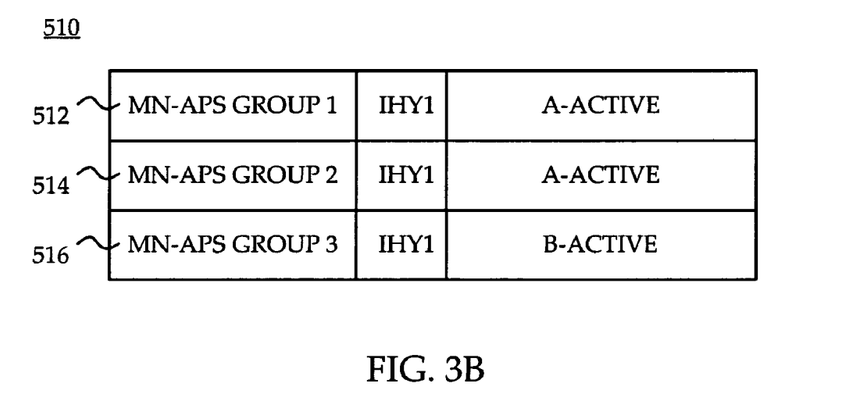
FIG. 3B is a block diagram of an example bundle of liveliness messages according to a preferred embodiment of the invention.
Figure 3C:
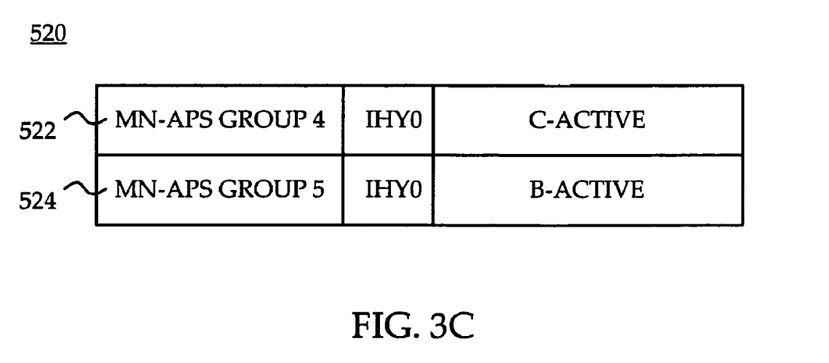
FIG. 3C is a block diagram of another example bundle of liveliness message according to a preferred embodiment of the invention.

In order to reduce the processing load on the equipment in the redundant nodes, liveliness messages which are sent between the same nodes are grouped together in bundles and are represented in FIGS. 3B and 3C. For the first and second remote nodes 320, 330, liveliness messages in respect of groups 1, 2, and 3 are exchanged, and hence are bundled together and sent in the same UDP packet. The liveliness message bundle 510 for the first remote node 320 and the second remote node 330 has a liveliness message 512 in respect of group 1, a liveliness message 514 in respect of group 2, a liveliness message 515 in respect of group 3. As shown, each liveliness message includes an MN-APS group ID, an IHY message, and a status/directive message. The IHY message is shown for groups 1, 2, and 3 as IHY1 which symbolizes that the IHY message flag is a true value which would be represented by a bit value of 1 in the preferred embodiment. The status/directive messages, when they originate from the node in protection mode, indicate or direct how the node in working mode is supposed to operate. In FIG. 3B, a directive to the first remote node 320 to remain in active mode in respect of groups 1 and 2 is represented by "A-Active" and a directive to the second remote node 330 to remain in active mode in respect of group 3 is represented by "B-Active". When the status/directive messages originate from the node in working mode, they report the status of the node in working mode. In FIG. 3B, a status of "status OK" is reported to the node in protection mode in respect of group 1 and 2, and is represented by "A-Active". A status of "status OK" is reported to the node in protection mode in respect of group 3, and is represented by "B-Active". By bundling the liveliness messages together in one packet, packet generation is reduced and processing power is conserved since more processing is required to generate and forward multiple packets than required to generate and forward a single packet having more information.

A similar bundle 520 of liveliness messages is shown in FIG. 3C. In this case however, the return control link 348 from the second remote node 330 to the third remote node 340 has failed (shown as an "X" 345 in the FIG. 4). Bundle 520 is an example of a bundle generated by the third remote node 340. Since the third remote node 340 cannot receive liveliness messages from the second remote node 330, the liveliness message it generates in respect of group 4 522, and the liveliness message it generates in respect of group 5 524 each have an IHY message flag of IHY0 which represents a false value for the IHY flag, which in the preferred embodiment is communicated in a single bit having a value of "0". As discussed above, this indicates to the second remote node 330 that the third remote node 340 cannot "hear" the liveliness messages it is sending.

Although the example configuration shown in FIG. 4 has only 5 groups and bundle sizes only of 3 and 2 MN-APS groups, the efficiency afforded by bundling liveliness messages of different MN-APS groups destined to a peer chassis is increasingly important as router port counts increase. In general a large number of MN-APS groups can be configured between a redundant pair of node which would benefit greatly from bundling of the liveliness messages between them.

In the preferred embodiment, to ensure quick detection of redundant pair failure, the periodic liveliness messages are sent reasonably frequently for example every few hundred milliseconds.

As discussed above in association with FIG. 2, in the event of a failure or degradation of the signal of the working circuit or the node in working mode, MN-APS 1+1 switches the data traffic from traversing the failed or degraded circuit to traversing the other circuit. In switching the data traffic, the protection circuit becomes an active circuit and the failed or degraded working circuit becomes an inactive circuit.

One of the benefits afforded by the use of the IHY message and the liveliness messaging protocol according to the preferred embodiment of the invention is the detection of a "one-way" control link failure by both peer nodes, which can be used to ensure that only one circuit remains active thus avoiding traffic duplication.

One of the benefits of bundling liveliness messages of different MN-APS groups destined for the same peer nodes is reduction of system processing usage which in turn supports the sending of liveliness checking messages more frequently. This allows even quicker detection of a nodal failure and thus results in shorter traffic interruption time, especially when larger number of MN-APS groups per redundant pair nodes are configured.

A benefit from adapting the APS 1+1 protocol to MN-APS 1+1 protocol is that time, and resources for development/testing for the MC-APS Control protocol signaling work is much lower than a completely new type of APS protocol.

It should be noted that although the preferred embodiment uses UDP for packet delivery of the liveliness messages between redundant pair nodes, other information exchange protocols may be used.

The embodiments presented are exemplary only and persons skilled in the art would appreciate that variations to the embodiments described above may be made without departing from the spirit of the invention. The scope of the invention is solely defined by the appended claims.

We claim:

1. An automatic protection switching system comprising:
   a local node for transmitting a first data stream to be protected; and
   a redundant protection pair of nodes comprising:
   a first remote node coupled to said local node, said first remote node receiving said first data stream from said local node, and
   a second remote node coupled to said local node and said first remote node, said second remote node receiving said first data stream from said local node;
   a first control link that sends periodic liveliness messages from the first remote node to the second remote node;
   a second control link that sends periodic liveliness messages from the second remote node to the first remote node;
   a first data link that couples the local node to the first remote node; and
   a second data link that couples the local node to the second remote node;
   wherein each periodic liveliness message sent on the first control link to said second remote node comprises an I Heard You (IHY) message, the IHY message indicating whether the first remote node received within a duration of a single liveliness message cycle a previously transmitted periodic liveliness message from the second remote node on the second control link, and
   wherein a protection switching behavior of the second remote node is triggered within substantially a single liveliness message cycle, depends upon the IHY message sent to the second remote node, and prevents duplication of data on the first data link and the second data link by deactivating one of the data links.

2. An automatic protection switching system according to claim 1, wherein the first remote node operates as a protection node of an APS 1+1 group, and the second remote node operates as a working node of said APS 1+1 group.

3. An automatic protection switching system according to claim 1, wherein the first remote node operates as a working node of an APS 1+1 group, and the second remote node operates as a protection node of said APS 1+1 group.

4. An automatic protection switching system according to claim 3, wherein the second remote node remains inactive when the IHY message from the first remote node indicates the first remote node did not receive within the duration of the single liveliness message cycle a previously transmitted liveliness message from the second remote node.

5. An automatic protection switching system according to claim 1,
   wherein each liveliness message sent on the second control link to said first remote node comprises an IHY message to indicate when the second remote node received within the duration of the single liveliness message cycle a previously transmitted liveliness message from the first remote node, and
   wherein the protection switching behavior of the first remote node is triggered within substantially the single liveliness message cycle depends upon the IHY message sent to the first remote node, and prevents duplication of data on the first data link and the second data link.

6. An automatic protection switching system according to claim 5, wherein each IHY message of each liveliness message is a single bit flag.

7. An automatic protection switching system according to claim 5, wherein the first remote node is adapted to:

operate in a first mode as a protection node of an APS 1+1 group; and operate in a second mode as a working node of the APS 1+1 group, and wherein the second remote node is adapted to:

operate in the second mode as the working node of an APS 1+1 group when the first remote node operates in the first mode; and operate in the first mode as the protection node of the APS 1+1 group when the first remote node operates in the second mode.

8. An automatic protection switching system comprising: a local node that transmits a plurality of data streams to be protected; and a redundant protection pair of nodes comprising:

a first remote node coupled to said local node, said first remote node receiving said plurality of data streams from said local node, and a second remote node coupled to said local node and coupled to said first remote node, said second remote node receiving said plurality of data streams from said local node;

a first control link that sends a periodic bundle of liveliness messages from the first remote node to the second remote node, the bundle comprising a liveliness message for each data stream;

a second control link that sends the periodic bundle of liveliness messages from the second remote node to the first remote node;

a first data link that couples the local node to the first remote node; and a second data link that couples the local node to the second remote node;

wherein, when the first remote node detects failure of the second remote node within a duration of a single liveliness message cycle based upon the periodic bundle of liveliness messages, the system deactivates forwarding of data traffic on the second data link to the second remote node and activates forwarding of data traffic on the first data link to the first remote node, wherein each of the liveliness messages comprises an IHY message, the IHY message indicating whether the remote node which sent the liveliness message received within a duration of a single liveliness message cycle a previously transmitted liveliness message from the remote node which received the liveliness message.

9. An automatic protection switching system according to claim 8, wherein each liveliness message comprises an IHY message indicating whether a peer node which generated the liveliness message is receiving liveliness messages from another peer node of the redundant protection pair of nodes.

10. An automatic protection switching system comprising: a local node that transmits a plurality of data streams to be protected; a redundant protection pair of nodes comprising:

a first remote node coupled to said local node, said first remote node receiving a first subset of data streams of said plurality of data streams from said local node;

a second remote node coupled to said local node, and coupled to said first remote node, said second remote node receiving said first subset of data streams of said plurality of data streams from said local node and a second subset of data streams of said plurality of data streams from said local node; and a third remote node coupled to said local node and coupled to said second remote node, said third remote node receiving said second subset of data streams;

a first control link that sends a periodic bundle of liveliness messages, the bundle comprising a liveliness message for each data stream, from the first remote node to the second remote node;

a second control link that sends the periodic bundle of liveliness messages from the second remote node to the first remote node;

a third control link that sends the periodic bundle of liveliness messages from the second remote node to the third remote node;

a fourth control link that sends the periodic bundle of liveliness messages from the third remote node to the second remote node; a first data link that couples the local node to the first remote node; a second data link that couples the local node to the second remote node; and a third data link that couples the local node to the third remote node;

wherein, when the second remote node detects failure of the third remote node within a duration of a single liveliness message cycle, the system deactivates forwarding of data traffic on the third data link to the third remote node and activates forwarding of data traffic on the second data link to the second remote node, wherein each of the liveliness messages comprises an IHY message, the IHY message indicating whether the remote node which sent the liveliness message received within a duration of a single liveliness message cycle a previously transmitted liveliness message from the remote node which received the liveliness message.

11. An automatic protection switching system according to claim 10, wherein the first remote node operates for each data stream of the first subset of data streams as one of:

a protection node of a first respective APS 1+1 group; and a working node of the first respective APS 1+1 group; and wherein the second remote node operates for each data stream of the first subset of data streams as one of:

the protection node of the first respective APS 1+1 group when the first remote node is operating as the working node;

the working node of the first respective APS 1+1 group when the first remote node is operating as the protection node; and wherein the second remote node operates for each data stream of the second subset of data streams as one of:

a protection node of a second respective APS 1+1 group; and a working node of the second respective APS 1+1 group; and wherein the third remote node operates for each data stream of the second subset of data streams as one of:

the protection node of the second respective APS 1+1 group when the second remote node is operating as the working node;

the working node of the second respective APS 1+1 group when the second remote node is operating as the protection node.

12. An automatic protection switching system according to claim 10, wherein each of the periodic liveliness messages comprises an IHY message to indicate when the first remote node that generated the periodic liveliness message received within a duration of a hold time a previously transmitted liveliness message from the second remote node receiving the periodic liveliness message, wherein a protection switching behavior of the second remote node receiving the IHY message is dependent upon the IHY message sent to the second remote node receiving the IHY message.

13. A method of automatic protection switching comprising:
- transmitting a first data stream either from a local node to a first remote node on a first data link or from the local node to a second remote node on a second data link, wherein switching between the first data link and the second data link is based upon periodic liveliness messages;
- transmitting periodic liveliness messages from the first remote node to the second remote node on a first control link and from the second remote node to the first remote node on a second control link; wherein each liveliness message sent to said second remote node comprises an IHY message, the IHY message indicating whether the first remote node received within a duration of a single liveliness message cycle a previously transmitted liveliness message from the second remote node; and
- preventing duplication of traffic on the first data link and the second data link based upon respective receipt of IHY messages on the first control link and the second control link.

14. A method of automatic protection switching according to claim 13, further comprising:
- performing protection switching at the second remote node based upon the IHY message sent on the first control link to said second remote node.

15. A method of automatic protection switching according to claim 13, wherein each liveliness message sent on the second control link to said first remote node comprises the IHY message to indicate whether the second remote node received within a duration of a single liveliness message cycle a previously transmitted liveliness message from the first remote node.

16. A method of automatic protection switching according to claim 15, further comprising:
- performing protection switching at the first remote node based upon the IHY message sent to said second remote node on the first control link.

17. A method of automatic protection switching according to claim 13, wherein the first remote node operates as a protection node of an APS 1+1 group, and the second remote node operates as a working node of said APS 1+1 group.

18. A method of automatic protection switching according to claim 13, wherein the first remote node operates as a working node of an APS 1+1 group, and the second remote node operates as a protection node of said APS 1+1 group.

19. A method of automatic protection switching comprising:
- transmitting a plurality of data streams either from a local node to a first remote node on a first data link or from the local node to a second remote node on a second data link, wherein switching between the first data link and the second data link is based upon a periodic bundle of liveliness messages;
- transmitting, on a first control link, the periodic bundle of liveliness messages, the periodic bundle comprising a liveliness message for each data stream of the plurality of data streams from the first remote node to the second remote node; and
- transmitting, on a second control link, the periodic bundle from the second remote node to the first remote node;
- wherein each liveliness message sent to said second remote node on the first control link comprises an I Heard You (IHY) message, the IHY message indicating whether the first remote node received within a duration of a single liveliness message cycle a previously transmitted liveliness message from the second remote node on the second control link.

20. A method of automatic protection switching comprising:
- transmitting a first plurality of data streams from a local node to a first redundant protection pair of nodes comprising a first remote node and a second remote node;
- transmitting a second plurality of data streams from a local node to a second redundant protection pair of nodes comprising the second remote node and a third remote node;
- transmitting a first periodic bundle of liveliness messages, the first periodic bundle comprising a liveliness message for each data stream of the first plurality of data streams, from the first remote node to the second remote node on a first control link;
- transmitting the first periodic bundle from the second remote node to the first remote node on a second control link;
- transmitting a second periodic bundle of liveliness messages, the second periodic bundle comprising a liveliness message for each data stream of the second plurality of data streams, from the second remote node to the third remote node on a third control link; and
- transmitting the second periodic bundle from the third remote node to the second remote node on a fourth control link;
- wherein each liveliness message comprises an IHY message, the IHY message indicating whether the remote node which sent the liveliness message received within a duration of a single liveliness message cycle a previously transmitted liveliness message from the remote node which received the liveliness message and deactivating at least one data link between the local node and at least one of the first remote node, second remote node, and third remote node on the basis of receipt of the IHY message.

21. The automatic protection switching system of claim 1, wherein each liveliness message further comprises an MN-APS group ID and a status/directive message.

* * * * *